United States Patent [19]

Asano et al.

[11] Patent Number: 5,896,540
[45] Date of Patent: *Apr. 20, 1999

[54] METHOD AND APPARATUS FOR CONTROLLING DATA TRANSFER BETWEEN A HOST AND A PERIPHERAL IN A PRE-READING MODE, POST-READING MODE AND BOTH-READING MODE

[75] Inventors: Hideo Asano, Tokyo; Masayuki Murakaami, Kanagawa-ken, both of Japan

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/496,284

[22] Filed: Jun. 28, 1995

[30] Foreign Application Priority Data

Jun. 29, 1994 [JP] Japan ................................ 6-148255

[51] Int. Cl.$^6$ ............................................. G06F 13/00
[52] U.S. Cl. .................... 395/733; 395/734; 395/735; 395/736; 395/737; 395/800.1; 395/800.32
[58] Field of Search ................................. 395/733, 375, 395/441, 734, 735, 736, 800.02, 800.1, 800.32; 364/200, 900; 369/54

[56] References Cited

U.S. PATENT DOCUMENTS

| | | | |
|---|---|---|---|
| 4,607,328 | 8/1986 | Furukawa et al. | 364/200 |
| 4,945,473 | 7/1990 | Holtey et al. | 364/200 |
| 4,947,366 | 8/1990 | Johnson | 364/900 |
| 5,014,237 | 5/1991 | Masters et al. | 364/900 |
| 5,233,591 | 8/1993 | Nishihara | 369/54 |
| 5,457,787 | 10/1995 | Asano et al. | 395/375 |
| 5,586,292 | 12/1996 | Yamaguchi | 395/441 |
| 5,684,997 | 11/1997 | Kau et al. | 395/733 |
| 5,727,221 | 3/1998 | Walsh et al. | 395/750 |
| 5,784,291 | 7/1991 | Chen et al. | 364/491 |

FOREIGN PATENT DOCUMENTS

3-3379   3/1991  Japan.
4-264371 9/1992  Japan.

*Primary Examiner*—Ayaz R. Sheikh
*Assistant Examiner*—Eric S. Thlang
*Attorney, Agent, or Firm*—Merchant, Gould, Smith, Edell, Welter & Schmidt, P.A.

[57] ABSTRACT

The object is to control an interrupt request to be asserted to a host in all of a prereading mode, a postreading mode, and a both-reading mode. Until the count value of a counter becomes equal to the content of a delay register, the reset state of a flip-flop is held and an IRQ is not asserted to the host. When the read signal of a status register is input through an OR gate to a flip-flop for a period in which the count value of the counter becomes equal to the content of the delay register, the flip-flop is set and the Q output remains held in a logic high state, as the postreading mode or the both-reading mode. When the counter value of the counter becomes equal to the content of the delay register, the output of a comparator will go low and the flip-flop will be reset, so that the IRQ is asserted to the host by a CDR.

18 Claims, 7 Drawing Sheets

METHOD AND APPARATUS FOR CONTROLLING DATA TRANSFER BETWEEN A HOST AND A PERIPHERAL IN A PRE-READING MODE, POST-READING MODE AND BOTH-READING MODE

BACKGROUND OF THE INVENTION

1. Field of the Invention.

The present invention relates to a data transfer control interface circuit and, more particularly, to an interface circuit for controlling data transfer by sending an interrupt from a peripheral device to a host and transferring data between the host and the peripheral device.

2. Description of Related Art.

In personal computer systems, AT interfaces are widely adopted to connect a host and its peripheral devices. A hard disk drive (HDD) is one of the typical peripheral devices. The manufacturers of peripheral devices desire standardized data transfer between a host and its peripheral devices through the AT interface. However, in some hosts, several operating sequences are possible depending on commands. For example, a read command to the HDD is executed according to when the host reads the status register of the HDD in either of two operating sequences. During a first operating sequence, referred to as the prereading mode, the HDD makes the data request (DRQ) bit of its status register high. At the same time the HDD asserts an interrupt request (IRQ) to the host when the HDD is ready for transferring data (normally data corresponding to one sector) to the host.

When the host receives the IRQ from the HDD, the host first reads the status register of the HDD. At this time, the IRQ is reset, i.e., dropped. Further, the IRQ is always reset when the host reads the status register. Thereafter, the host starts transferring data. When the transfer of data corresponding to one sector is completed, the HDD will reset the DRQ once. This process is repeated until the data has transferred.

The above-described sequence is referred to as prereading mode since the host reads the status register before data is transferred. However, there are some cases in which a read command is processed differently. The second sequence will hereinafter be referred to as "postreading (second mode)" because a host reads a status register after data transfer corresponding to one sector is completed.

The HDD makes the data request (DRQ) bit of its status register high and at the same time asserts an interrupt request (IRQ) to the host when the HDD is ready for transferring data (normally data corresponding to one sector) to the host. If a host receives an IRQ from a HDD, the host first starts transferring sector data and transfers it until the sector end. When the transfer of data corresponding to one sector is completed, the HDD will reset the DRQ once. The host reads the status register of the HDD. This resets the IRQ. However, there are some cases in which the IRQ is reset concurrently when the DRQ is reset. These steps are repeated until the data is transferred.

When the host is operated in the postreading mode, there is a case in which an erroneous operation occurs. This error occurs when the host reads the status register of the HDD to determine whether a current sector status is later than when the HDD is ready for the next sector. In this case, the next IRQ is reset by the reading of the status register in the previous sector transfer. Thus, the host continues to wait for the IRQ of the next sector and the HDD continues to wait for data transfer. Since the IRQ of the next sector is accessed by hardware as soon as sector data is ready, this problem occurs often.

To avoid the above-described abnormal situation, the IRQ of the next sector must be asserted after the host has read the status register. However, if the IRQ is merely delayed, data transfer performance becomes deteriorated when the host is in the prereading mode. Therefore, on the one hand in the prior art, a method is taken in which a switch is set according to whether the host is in the prereading mode or in the postreading mode.

In the postreading mode, the IRQ is not delayed but is again asserted immediately when the status register is read. This prevents deterioration of performance in the case of postreading. However, there are many cases where the latest host is in the prereading mode or in the postreading mode, depending upon the operating system. For example, in OS/2, the host is in the prereading mode and, in an ordinary DOS, the host is in the postreading mode. In such cases, a switch must be set each time the mode changes.

On the other hand, there is also a method in which IRQ is controlled with a microcode. In this method since the timing is delayed at all times (when the IRQ is asserted) both the prereading mode and the postreading mode are operated normally, but the performance is bad compared with the case where hardware control is used.

In order to overcome the above-described problems, an interface circuit which automatically detects whether a host is a prereading mode or a postreading mode, has been proposed in a Japanese Patent Application No. HEI 3-3379, which is a prior application of the present applicant, and which is incorporated by reference herein. This interface circuit comprises a mode detection circuit, a delay circuit and an interrupt request generation circuit. The mode detection circuit automatically detects the mode of a host in accordance with the status of a data request signal DRQ from the controller of a HDD and with the status of an IRQ signal to be sent to the host. The delay circuit delays the DRQ by a predetermined time when the host is in the postreading mode. The interrupt request generation circuit generates an IRQ to be sent to the host in response to an output of the delay circuit (controlled DRQ). When the mode detection circuit detects that the host is the prereading mode, the delay circuit is not operated and the DRQ is supplied as a controlled DRQ to the interrupt request generation circuit without delay.

When the above-described interface circuit is employed, the operating performance will be improved compared with the conventional method of converting with a switch and the method of controlling with a microcode. However, since the delay time of the DRQ is determined in advance, there is the problem that, even if the status reading by the host is completed before the determined delay time elapses, the IRQ could not be output immediately.

In consideration of the above-described problem, the present applicant has proposed in a Japanese Application No. HEI 4-264371, herein incorporated by reference, an interface circuit for controlling data transfer. The interface circuit includes an interrupt generation circuit, a postreading mode detection circuit and an interrupt bias circuit. The interrupt generation circuit generates an IRQ signal that is sent to a host in response to a DRQ from a controller. The interrupt generation circuit drops the IRQ when status is read by the host. The postreading mode detection circuit for receiving the DRQ and IRQ generates a postreading signal that indicates that the host is in a postreading mode when detecting that the IRQ remains generated after the DRQ is dropped. The interrupt bias circuit, in response to the postreading signal and the status reading of the host, generates a new IRQ by biasing the interrupt request generation circuit.

Thus, since, in response to the postreading signal and the status reading of the host, a new IRQ is generated by biasing the interrupt request generation circuit, the next interrupt request can immediately be generated if status reading occurs when the host is in the postreading mode.

In addition to the above-described prereading and postreading, the operating sequence in which the read command to the HDD is executed has a third mode in which a host reads the status register of a HDD before and after data transfer. This mode is also referred to the both-reading mode.

However, in the above-described conventional interface circuit for controlling data transfer, the interface circuit cannot cope with the both-reading mode since the generation of the IRQ to be asserted to the host is controlled in response to the DRQ from the controller when the host is in both the prereading mode and the postreading mode.

It can be seen then that there is a need to provide an interface circuit for managing data transfer by controlling an interrupt request that is sent to a host in a prereading mode, a postreading mode, and a both-reading mode.

SUMMARY OF THE INVENTION

To overcome the limitations in the prior art described above, and to overcome other limitations that will become apparent upon reading and understanding the present specification, the present invention discloses a data transfer control interface circuit and method.

The present invention solves the above-described problems by providing a data transfer control interface circuit for a computer system operated in a first mode wherein a peripheral device generates a data request when it is ready for block data transfer and sends an interrupt request to a host. In response to the interrupt request, the host starts said block data transfer after reading the status of the peripheral device.

The control interface circuit also facilitates a second mode in which the host reads the status of the peripheral device after the block data transfer is completed. Still further the control interface circuit facilitates a third mode in which the host starts the block data transfer after reading the status of said peripheral device and reads the status of the peripheral device after said block data transfer is completed.

The present invention comprises a determination means for determining whether the status is read or not after the first block data transfer, and an interrupt request output means for sending an interrupt request to the host by changing the timing according to the determination result of the determination means. The determination means in the invention includes a flip-flop which is set on the condition that a signal for reading the status was input from the host.

Furthermore, the determination means in the invention determines whether the status is read or not within a predetermined period of time after completion of the first block data transfer. If the status was not read by the determination means, the interrupt request output means sends the interrupt request to the host after the elapse of the predetermined period of time. When the status is read by the determination means, the interrupt request output means sends the interrupt request to the host before the elapse of said predetermined period of time. A disk drive may be coupled to the host via the interface circuit.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an interface circuit for controlling data transfer by sending an interrupt from a peripheral device to a host and transferring data between the host and the peripheral device.

Figure 1:
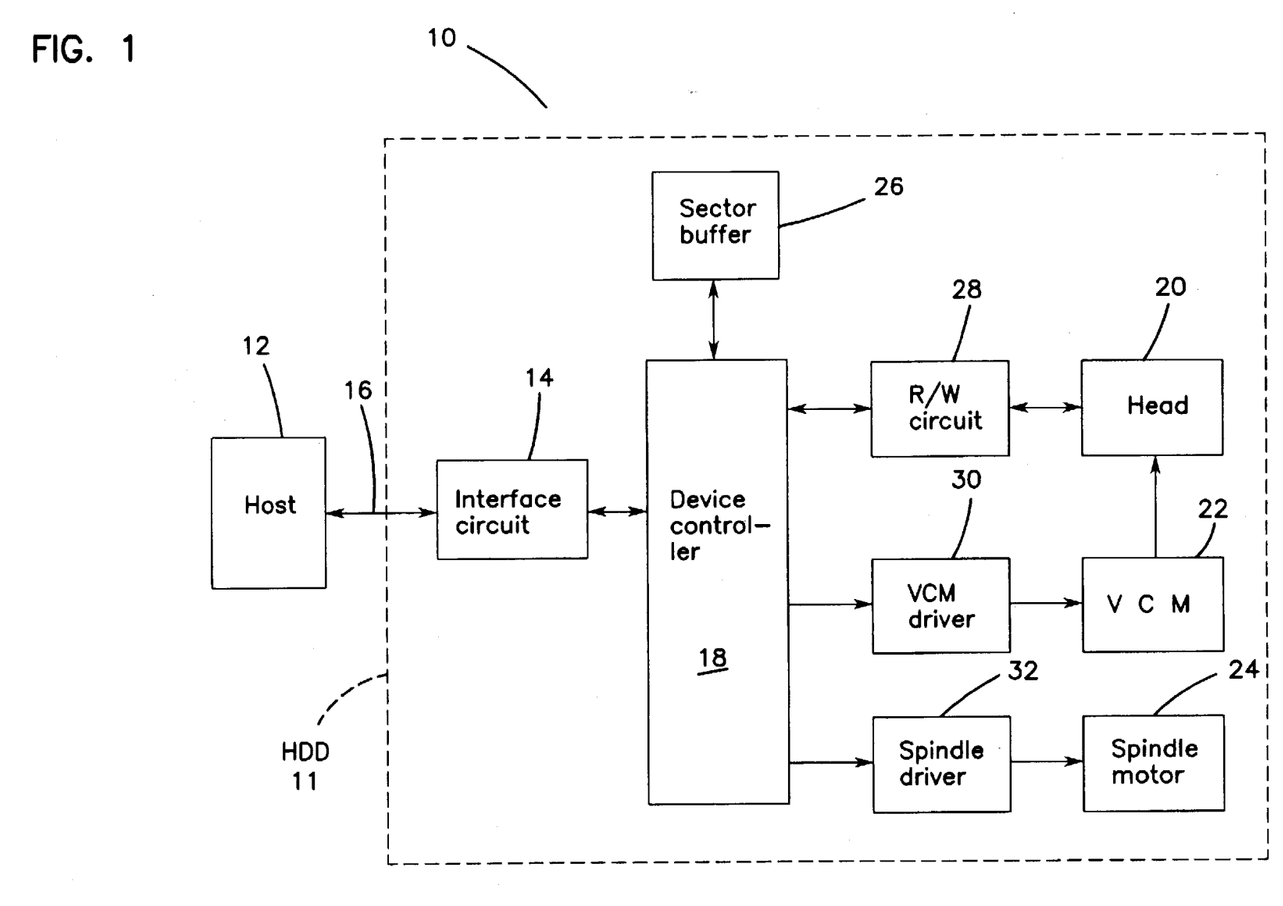
FIG. 1 is a block diagram showing the construction of a computer system implementing an interface circuit of the present invention.

FIG. 1 illustrates an exemplary system 10 incorporating an interface circuit 14 according to the present invention. In this embodiment, a HDD is assumed as a peripheral device, but the present invention can be applicable to any of the peripheral devices that encounter the above-described prereading, postreading and both-reading problems.

In FIG. 1, a HDD 11 enclosed by a dotted line is connected through an interface circuit 14 and a system bus (AT bus) 16 to a host 12. The host 12 includes a microprocessor such as I80386 and, together with the HDD 11 and other peripheral devices such as a keyboard and a display (not shown), constitutes a personal computer system of the present applicant or its compatible system.

The HDD 11 includes a microprocessor-controlled device controller 18 for administering the overall control of the HDD. The main function of the device controller 18 comprises three controls.

More particularly, there is the control of reading and writing using a head 20, the control of a voice coil motor (VCM) 22 for moving the head 20, and the control of a spindle motor 24 for rotating a disk (not shown). The reading and writing by the head 20 are performed with the aid of a sector buffer 26 for storing data corresponding to a predetermined number of sectors and a read/write circuit 28. The read/write circuit 28 includes various circuits necessary for reading and writing, such as an amplifier, a peak detector, a variable frequency oscillator (VFO), an encoder, a decoder, servo logic, an analog-to-digital converter, and a digital-to-analog converter. The control of the VCM 22 is performed by a VCM driver 30 while the control for the spindle motor 24 is performed by a spindle driver 32. Except for the interface circuit 14, the system elements shown in FIG. 1 are well known. Thus, a detailed description of these elements will not be given.

Figure 2:
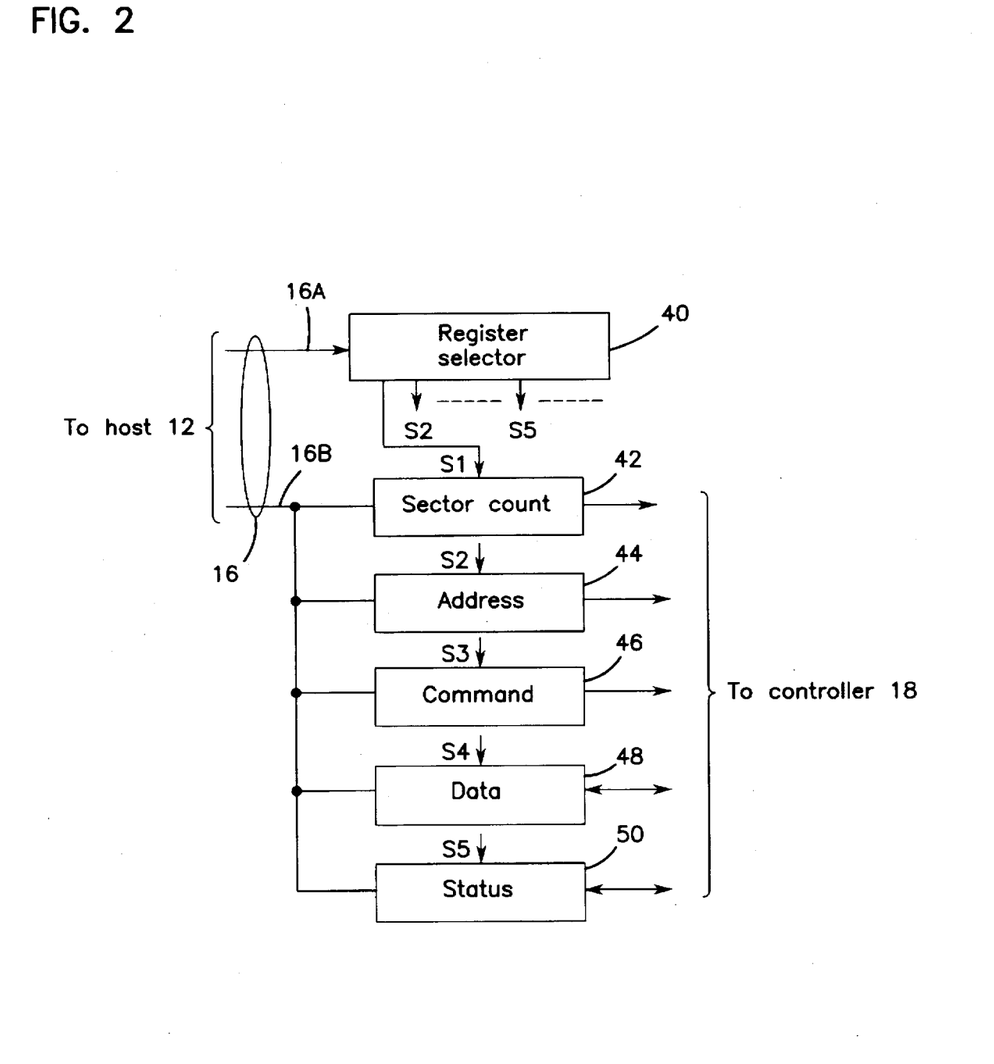
FIG. 2 is a block diagram showing the construction of an input/output unit of the interface circuit with respect to the host.

The construction of the input/output unit of the interface circuit 14 is shown in FIG. 2. The input/output unit includes a plurality of registers that are selected by means of a register selector 40. More particularly, the input/output unit includes a sector count register 42, an address register 44, a command register 46, a data register 48, and a status register 50. The address register 44 actually comprises four registers (i.e., two cylinder address registers, one sector address register, and one drive/head address register), but in this embodiment these registers are handled as one register for reasons of convenience.

The sector count register 42 holds the number of sectors in which reading or writing is performed while the address register 44 holds a start address of the sector. The command register 46 holds a command code and the data register holds data to be written from the host 12 to the HDD 11 or data to be read from the HDD 11 to the host 12. Finally, the status register 50 includes a plurality of bits representing the status of the HDD.

These registers are selected according to information that is supplied from the host 12 through the system bus 16 to the register selector 40. At that time, the register selector 40 generates a signal Si (i=1, 2, 3 . . . ) for selecting a specific register. In FIG. 2, there are shown only the five registers that are necessary for the purpose of understanding the present invention, but in fact many more registers may be provided.

When sending a command to the interface circuit 14, the host 12 places an address for selecting a specific register and an input-output write signal on a first bus 16A. The host also places information to be written to a selected register on a second bus 16B. The first bus 16A and the second bus 16B are a part of the system bus 16.

As an example of a read command, the host 12 initially places on the first bus 16A a write command signal to the sector count register 42, i.e., an address of the sector count register 42 and an input-output write signal. Then a sector count is placed on the second bus 16B. The register selector 40, in response to the signals on the first bus 16A, generates a signal S1 for selecting the sector count register 42, and loads the sector count on the second bus 16B into the register 42. Next, the host 12 places a write command signal to the address register 44 on the first bus 16A and a start address on the second bus 16B. In response to this, the register selector 40 generates a signal S2 and selects the address register 44. The register selector 40 then loads the start address on the second bus 16B into the address register 44. Next, the host 12 places a write command signal to the command register 46 on the first bus 16A and a read command code on the second bus 16B.

The read command code is thus loaded into the command register 46. If the loading of the registers 42, 44, and 46 is completed, then the controller 18 executes the reading operation specified according to the contents of these registers and writes data read from the disk to the sector buffer 26.

In the case of the write command, in addition to the above described, data to be written to the disk is sent from the second bus 16B to the data register 48. However, since the above-described prereading and postreading problems do not occur in the case of a writing operation, a description of the writing operation will not be given.

The data transfer from the HDD 11 to the host 12 during a reading operation is performed based on interrupts. As described hereinbefore, if data of a predetermined number of sectors (e.g., data corresponding to one sector) is written from the disk to the sector buffer 26 and the data transfer to the host is ready, the HDD 11 will send a data request signal DRQ to the interface circuit 14. In response to this and in order to start the data transfer from the sector buffer 26 to the host 12, the interface circuit 14 sends an interrupt signal to the host 12.

Figure 3:
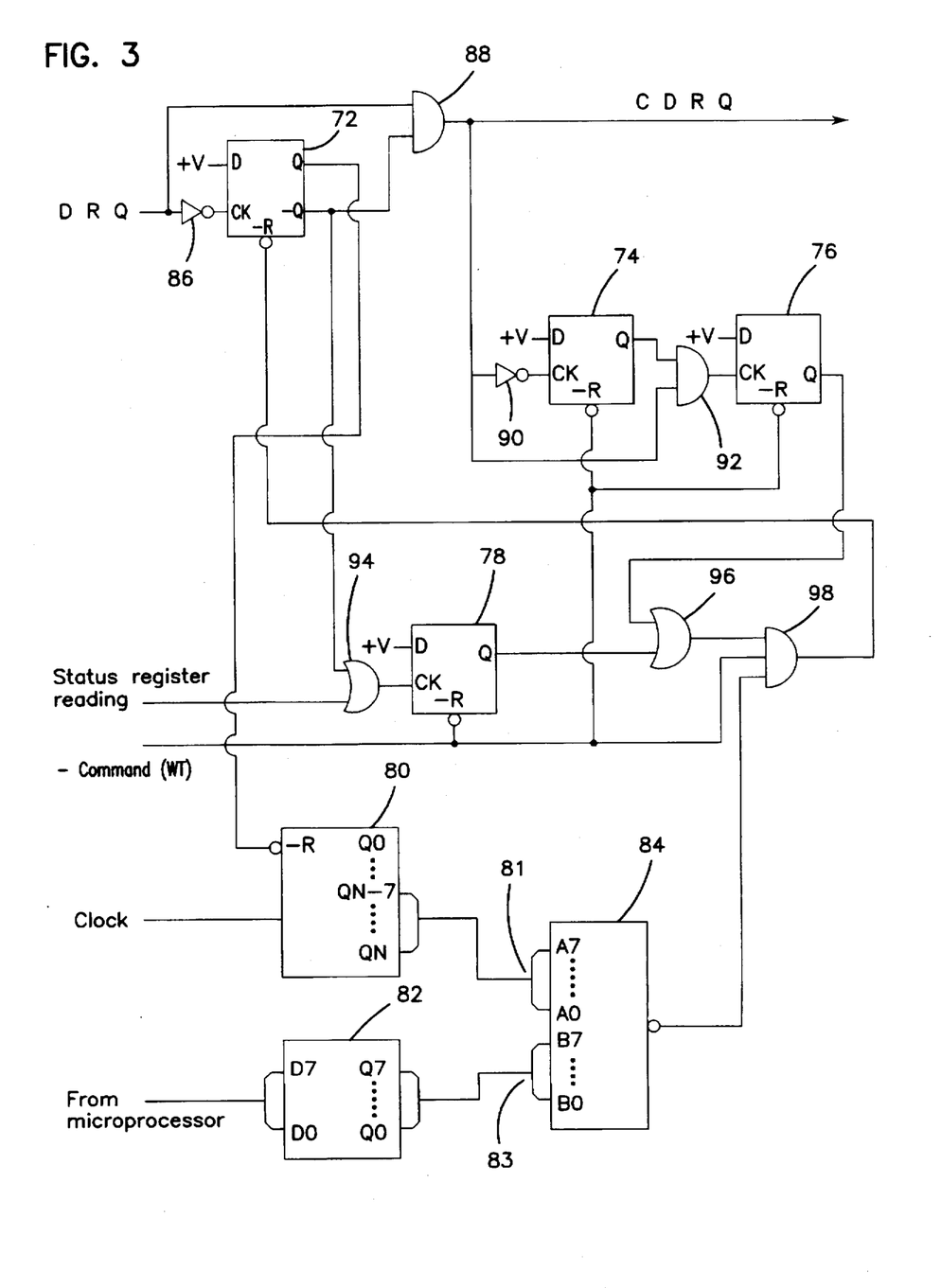
FIG. 3 is a circuit diagram showing the construction of an interrupt control unit of the interface circuit.

FIG. 3 is a detailed circuit diagram of an interrupt control unit of the interface circuit 14. The data terminal D of a first flip-flop 72 of the interrupt control unit is held in a logic high state at all times, and the clock terminal CK receives the data request signal DRQ sent from the controller 18 through an inverter 86. The negative reset terminal –R is connected to the output of a 3-input AND gate 98. The Q output of the first flip-flop 72 is connected to the negative reset terminal –R of a counter 80, while the –Q output is connected to the second input of an AND gate 88. The –Q output is further connected to the first input of an OR gate 94. The first input of the AND gate 88 receives the data request signal DRQ sent from the controller 18.

The output of the AND gate 88 is connected through a bus driver (not shown) to the bus line of the host 12 and is also connected through an inverter 90 to the clock terminal CK of a second flip-flop 74. The data terminal D of the second flip-flop 74 is held in a logic high state at all times, and the Q output is connected to the first input of an AND gate 92. The output of the AND gate 88 is connected to the second input of the AND gate 92.

The output of the AND gate 92 is connected to the clock terminal CK of a third flip-flop 76. The data terminal D of the third flip-flop 76 is held in a logic high state at all times, and the –Q output is connected to the first input of an OR gate 96.

Input from the host is provided to the second input of the OR gate 94 whose first input is connected to the –Q output of the first flip-flop 72. This input provides a signal for reading the status of the status register 50. The output of the OR gate 94 is connected to the clock terminal CK of a fourth flip-flop 78. The data terminal D of the fourth flip-flop 78 is held in a logic high state at all times, and the Q output is connected to the second input of the OR gate 96. The output of the OR gate 96 is connected to the first input of the 3-input AND gate 98. To the second input of the 3-input AND gate 98, there is input a write command signal.

The Q output of the first flip-flop 72 is connected to the negative reset terminal –R of a counter 80. A negative input to the negative reset terminal –R causes the reset state of the counter 80 to be cleared, and the counter 80 starts counting in response to a clock. The count value of the counter 80 is input to the first input 81 (A7, A6, . . . A0) of a comparator 84. A delay value set in a delay register 82 is provided to the second input 83 (B7, B6, . . . B0) of the comparator 84. Each time the delay register 82 is turned on, a predetermined delay value is loaded from a microprocessor (not shown) of the controller 18 into the register 82. The inverted output of the comparator 84 is input to the third input of the 3-input AND gate 98.

Each of flip-flops 72, 74, 76, and 78 is set to the state of the data terminal D in response to a positive transition on the clock terminal CK and is reset if the reset terminal –R goes to a logic low level. However, insofar as the present invention is concerned, each flip-flop may be of the negative transition responsive type, and the setting and the resetting may also performed with a logic high level signal. Further, as to logic, using positive logic such as AND gates and OR gates in place of negative logic such as NAND gates and NOR gates is also possible.

The operation of the interface circuit of the embodiment of the present invention will hereinafter be described in detail. First, the operation in the prereading case will be described with reference to the timing diagram shown in FIG. 4. As described hereinbefore, the read command comprises a sector count for specifying the number of sectors to be read, a start address, and a command code. If these are received by the registers 42, 44 and 46 of FIG. 2, the controller 18 starts reading from the disk to the sector buffer 26. When data corresponding to one sector is written to the sector buffer 26, the controller 18 generates the data request signal DRQ and sends it to the interrupt control unit (FIG. 3) of the interface circuit 14.

The DRQ is applied to the AND gate 88. Also, the DRQ is inverted by means of the inverter 86 and applied to the clock terminal CK of the flip-flop 72 as illustrated in FIG. 4(a) at t1.

Even if the inverted DRQ is applied, the flip-flop 72 is not set, the Q output remains held in a logic low state, and the –Q output remains held in a logic high state. Therefore, on the one hand, since the DRQ and the –Q output of logic high are applied, a newly generated DRQ (controlled DRQ (CDRQ)) causes an IRQ to be asserted to the host as shown in FIG. 4(d) at t1. Thereafter, the IRQ is reset when data transfer is completed. The IRQ asserted to the host may also be reset when the host reads the status register.

Figure 4:
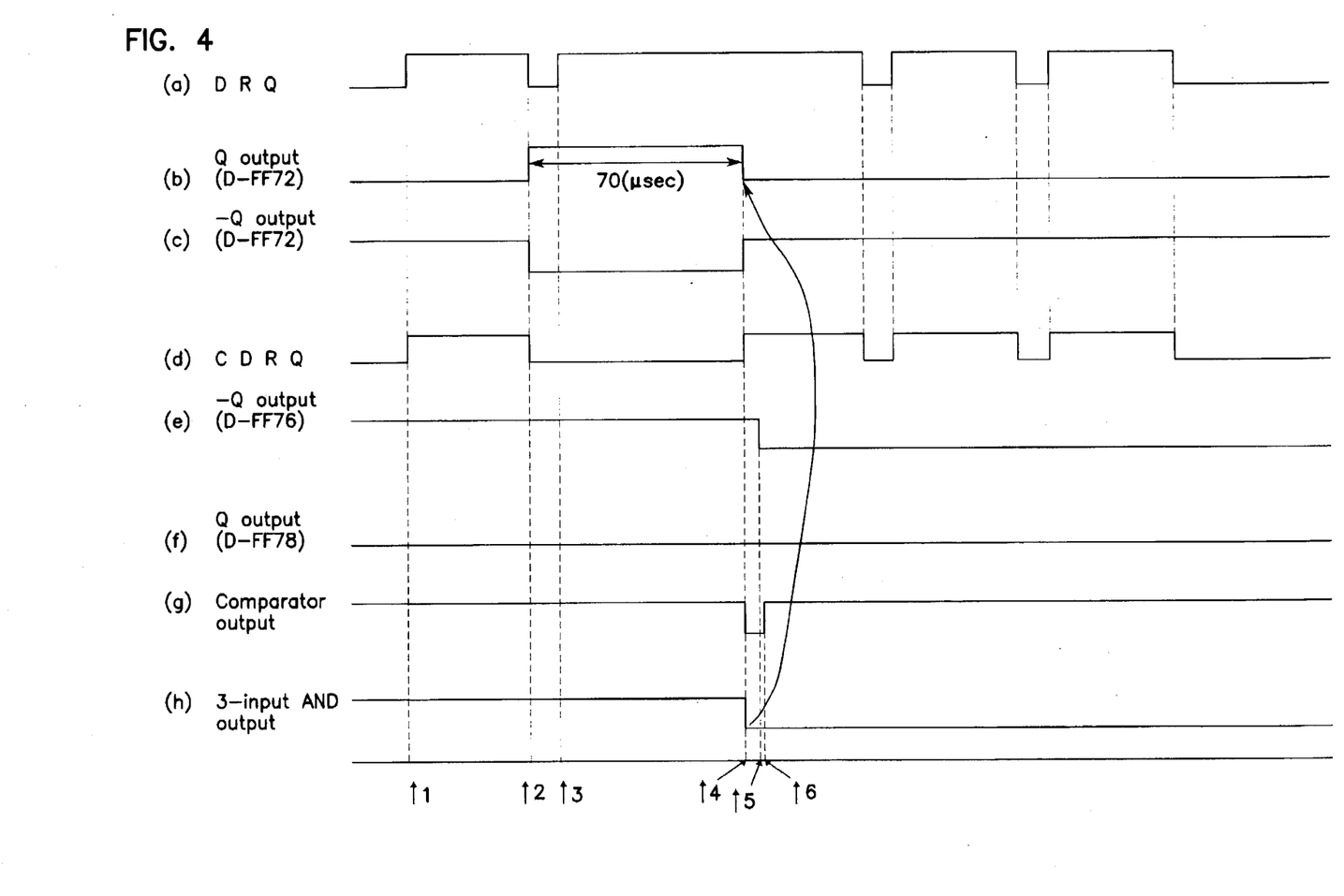
FIG. 4 is a timing diagram illustrating the operation of the invention in a prereading mode.

On the other hand, since the flip-flops 76 and 78 have been reset, the –Q output of the flip-flop 76 is high as shown in FIG. 4(e) and the Q output of the flip-flop 78 is low as shown in FIG. 4(f). The logic high –Q output from the flip-flop 76, the logic high of the command signal, and the logic high, inverted output from the comparator 84 have all been input to the 3-input AND gate 98. Since the logic high output from the 3-input AND gate 98 has been input to the negative reset terminal –R of the first flip-flop 72, the reset state of the flip-flop 72 has been cleared (FIG. 4, t1 to t4).

Thereafter, when the data transfer is started and the transfer of one block data is completed, the DRQ goes low as shown in FIG. 4(a) at t2. The DRQ goes low, and the positive transition of the DRQ inverted by the inverter 86 causes the flip-flop 72 to be set, so that the Q output goes high as shown in FIG. 4(b) at t2 and the –Q output goes low as shown in FIG. 4(c) at t2. This causes the CDRQ to go low as shown in FIG. 4(d) at t2.

When the controller 18 performs the reading from the disk to the sector buffer 26 during transfer of one block data and data corresponding to the next sector is written, the controller 18 will generate a DRQ again. This causes the DRQ generated again to be input as shown in FIG. 4(a) at t3. When data exists in the sector buffer 26, a DRQ is output immediately.

Also, the Q output of the flip-flop 72 made high is output to the counter 80, so that the reset state of the counter 80 is cleared. As long as the flip-flop 72 is reset and the negative reset terminal –R of the counter 76 is held in a logic low state, the counter 80 is in the reset state. When the reset state of the counter 80 is cleared, the counter 80 starts counting and increments its count value by one each time a clock pulse is applied. The content of the counter 80 is supplied to the comparator 84, in which the content of the counter 80 is compared with the content of the delay register 82.

When the delay register 82 is on, a predetermined delay value has been loaded from the microprocessor (not shown) of the controller 18. This delay value is programmable and set in advance so as not to interfere with the interrupt response of the host 12. In this embodiment, the length of the delay value to be loaded into the register 82 has been set so that, when a period of 70 1s elapses from the time the flip-flop 72 is reset and the Q output goes low as shown in FIG. 4(b) at t2, the count value of the counter 80 becomes equal to the content of the delay register 82.

Incidentally, since the host reads the status of the status register 50 after data transfer is completed in the postreading and bqth-reading to be described later, the read signal of the status register 50 is input through the OR gate 94 to the flip-flop 78 for a period of 70 µs during which the count value of the counter 80 becomes equal to the content of the delay register 82. Therefore, the Q output of the flip-flop 78 goes high and is input to the OR gate 96.

However, since in the prereading the block data transfer is started after the status of the status register 50 has been read, there is no possibility that the read signal of the status register 50 is input for the period during which the count value of the counter 80 becomes equal to the content of the delay register 82. Therefore, it can be determined whether the host is in the prereading mode or not by establishing whether the read signal of the status register 50 is input to the flip-flop 78 for the period of 70 µs.

If the count value of the counter 80 becomes equal to the content of the delay register 82, then the output of the comparator 84 goes low as shown in FIG. 4(g) at t4, and the output of the 3-input AND gate 98 goes low as shown in FIG. 4(h) at t4. Thus, the logic low output of the 3-input AND gate 98 is output to the negative reset terminal –R of the flip-flop 72 and the flip-flop 72 is reset. If the flip-flop 72 is reset, the Q output will go low as shown in FIG. 4(b) at t4, and the –Q output will go high as shown in FIG. 4(c) at t4. Therefore, a newly generated CDRQ as shown in FIG. 4(d) at t4 causes an IRQ to be asserted again to the host. The –Q output of the flip-flop 76 goes low as shown in FIG. 4(e) at t5.

Even if the output of the comparator 84 goes high again as shown in FIG. 4(g) at t6, the Q output of the flip-flop 78 is low because the read signal of the status register 50 has not been input. Since the –Q output of the flip-flop 76 is also held in the low state as shown in FIG. 4(e) after t5, the output of the 3-input AND gate 98 remains held in the low state as shown in FIG. 4(h) after t4. Therefore, the flip-flop 72 is not reset, and the Q output of the flip-flop 72 remains held in the low state. The –Q output of the flip-flop 72 remains held in the high state as shown in FIG. 4(c) after t4. Therefore, according to the rise of the DRQ of the controller 18, the CDRQ rises and the IRQ is asserted to the host.

Figure 5:
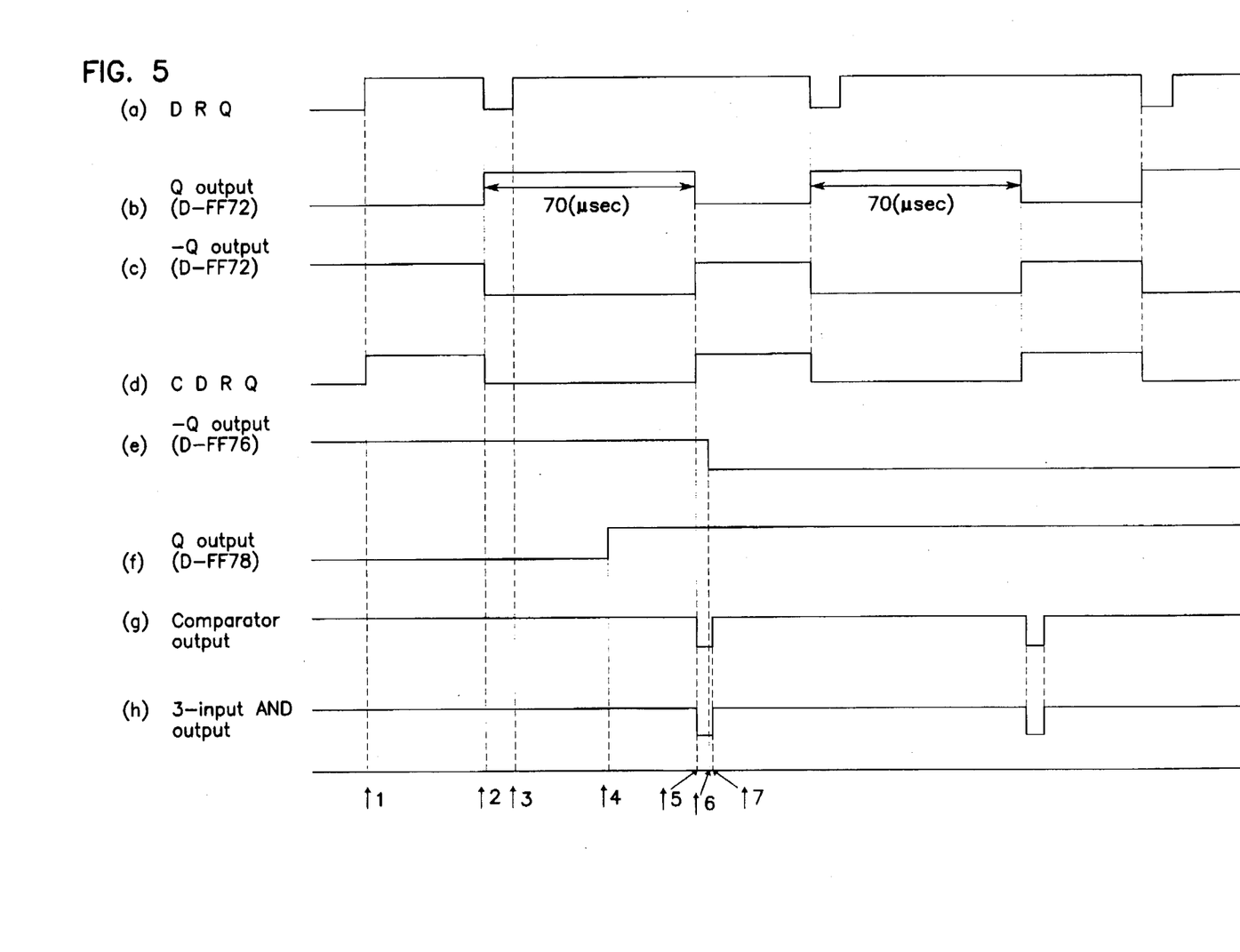
FIG. 5 is a timing diagram illustrating the operation of the invention in a postreading mode and a both-reading mode.

The operation in the postreading case and in the both-reading case will hereinafter be described with reference to the timing diagram shown in FIG. 5.

The prereading and the both-reading modes of operation according to this embodiment of the invention are the same as the prereading, until the count value of the counter 80 becomes equal to the content of the delay register 82.

As described above, the read signal of the status register 50 is input through the OR gate 94 to the flip-flop 78 for a period of 70 μs during which the count value of the counter 80 becomes equal to the content of the delay register 82, since in the postreading and both-reading cases the host reads the status of the status register 50 after data transfer is completed. This causes the flip-flop 78 to be set and the Q output to be held in the high state as shown in FIG. 5(f) after t4.

If the count value of the counter 80 becomes equal to the content of the delay register 82, then the output of the comparator 84 goes low and the flip-flop 72 is reset. As described hereinbefore, the Q output goes from a logic high level to a logic low level as shown in FIG. 5(b) at t5. The −Q output then goes from a logic low level to a logic high level as shown in FIG. 5(c) at t5. A newly generated CDRQ, as shown in FIG. 5(d) at t5, causes the IRQ to be asserted again to the host. Thereafter, even if the output of the comparator 84 goes high again, as shown in FIG. 5(d) at t7, and the −Q output of the flip-flop 76 goes low, the read signal of the status register is input and the Q output of the flip-flop 78 is high as shown in FIG. 5(f) at t4. The output of the 3-input AND gate 98 goes high as shown in FIG. 5(h) at t7, and the reset of the flip-flop 72 is cleared.

As described hereinabove, even if the −Q output of the flip-flop 76 goes low, the Q output of the flip-flop 78 has been high because the read signal of the status register has been input, and the output of the 3-input AND gate 98 goes high. This causes the reset of the flip-flop 72 to be cleared, and after a period of 70 μs elapses, a newly generated CDRQ causes the IRQ to be asserted to the host. During the 70 gs elapse, the count value of the counter 80 becomes equal to the content of the delay register 82.

In this embodiment, the host is in the prereading mode when the read signal of the status register 50 is not input through the OR gate 94 to the flip-flop 78 for a period of 70 μs during which the count value of the counter 80 becomes equal to the content of the delay register 82. Accordingly, whether the host is in the prereading mode or not, or whether the host is in the postreading (both-reading) mode or not can readily be determined.

In addition, when the read signal of the status register 50 is not input through the OR gate 94 to the flip-flop 78 for the above-described period of 70 μs, it is determined that the host is in the postreading or both-reading mode, and the IRQ is not asserted until the above-described period of 70 μs elapses after completion of one block data transfer. Accordingly, the reading of the status register 50 after the completion of data transfer in the prereading and in the both-reading is performed with reliability.

While it has been described that a period of 70 μs elapses after the Q output of the flip-flop 72 has gone high, and the above-described delay value is set so that the count value of the counter 80 becomes equal to the content of the delay register 82, it is to be noted that the present invention is not limited to this but it is applicable to any of the delay values which can reliably read the status register after the completion of one block data transfer in the postreading and both-reading cases. It is to be noted that, in this respect, the same is applied to a second embodiment to be described below.

Figure 6:
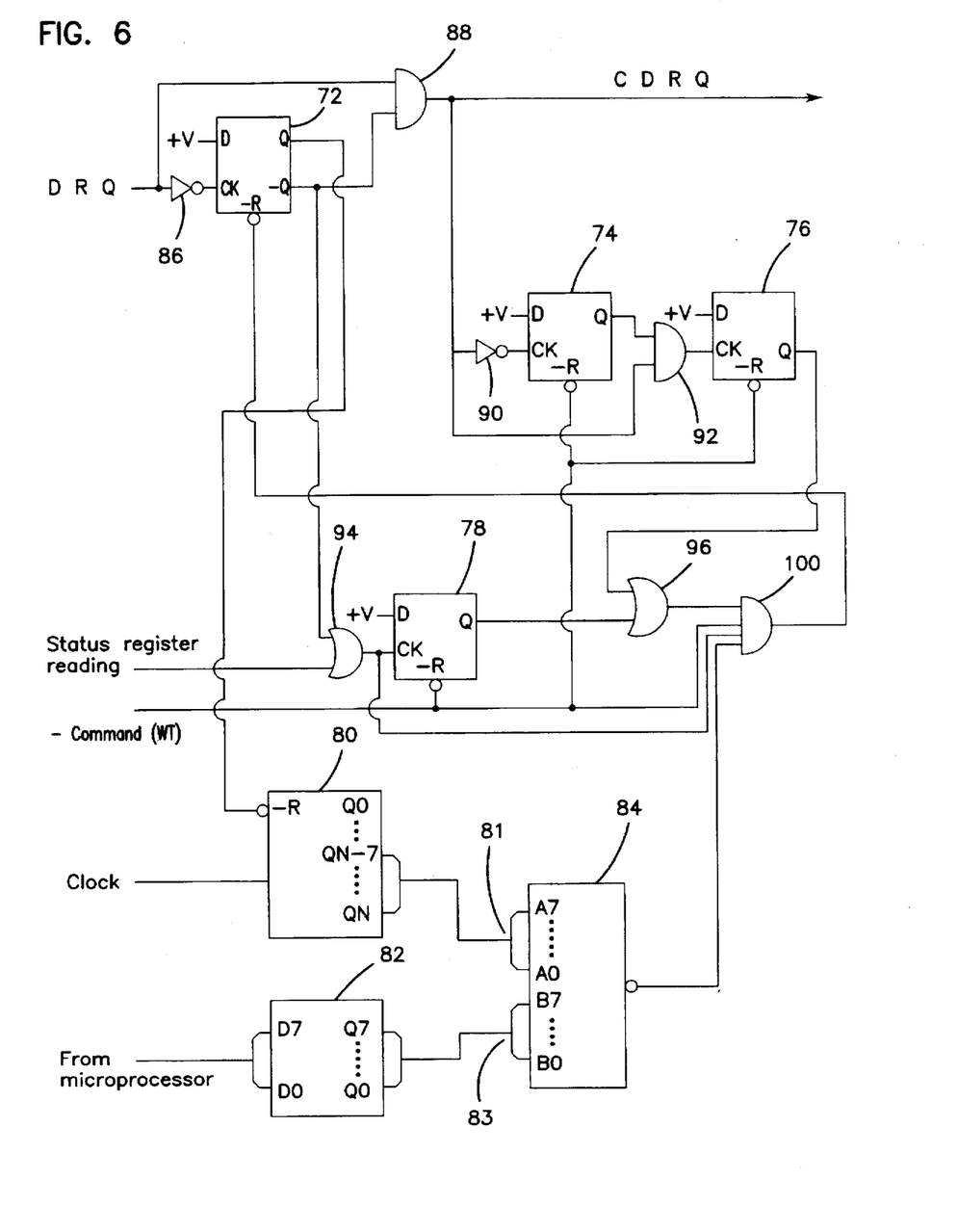
FIG. 6 is a circuit diagram showing the construction of an interrupt control unit of the interface circuit of a second embodiment of the present invention.

The second embodiment of the present invention will hereinafter be described with reference to FIGS. 6 and 7. As shown in FIG. 6, many parts of this embodiment are substantially identical with the above-described first embodiment, and therefore a detailed description of the identical parts will not be given and the same reference numerals and characters will be applied to the identical parts.

The second embodiment is provided with a 4-input AND gate 100 in place of the 3-input AND gate 98 in the above-described first embodiment. To an additional input of this 4-input AND gate 100 there is connected the output of OR gate 94.

The operation of the prereading case of the second embodiment is the same as the above-described first embodiment. In the postreading and both-reading of the above-described first embodiment, in order to ensure that the host reliably reads the status register 50 after data transfer has been completed and the DRQ has gone low, the IRQ is not asserted to the host until the count value of the counter 80 becomes equal to the content of the delay register 82 (i.e., after an elapse of 70 μs). Therefore, even if the host reads the status register 50 and the IRQ is ready for being asserted to the host, the IRQ cannot be asserted to the host until this 70 μs elapse. For this reason, optimal operating performance of the computer system is not realized.

Therefore, in order to enhance the overall operating performance of the computer system, it becomes necessary for the host to be able to read the status register 50 reliably after data transfer has been completed and the DRQ has gone low. Further, as soon as the host reads the status register 50, the IRQ should be asserted to the host.

To make this possible, the second embodiment is constructed such that the 4-input AND gate 100 is provided in place of the 3-input AND gate 98 of the above-described first embodiment. Furthermore, the output of the OR gate 94 is connected to the additional input of the 4-input AND gate 100.

More particularly, one block data transfer is completed, the DRQ goes low, the Q output of the flip-flop 72 is supplied to the counter 80, and the counter 80 starts counting. Thereafter, when the host reads the status register 50, the read signal of the status register 50 is output to the OR gate 94. The output of the OR gate 94 is then supplied to the 4-input AND gate 100, and the logic low output of the 4-input AND gate 100 is supplied to the negative reset terminal −R of the flip-flop 72. This causes the −Q output of the flip-flop 72 to go high and the IRQ to be asserted to the host.

Thus, in the second embodiment, the overall operating performance of the computer system is enhanced, since in the postreading or both-reading case the host is able to read the status register 50 reliably after one block data transfer has been completed and, at the same time, the IRQ is asserted to the host as soon as the host reads the status register 50.

Figure 7:
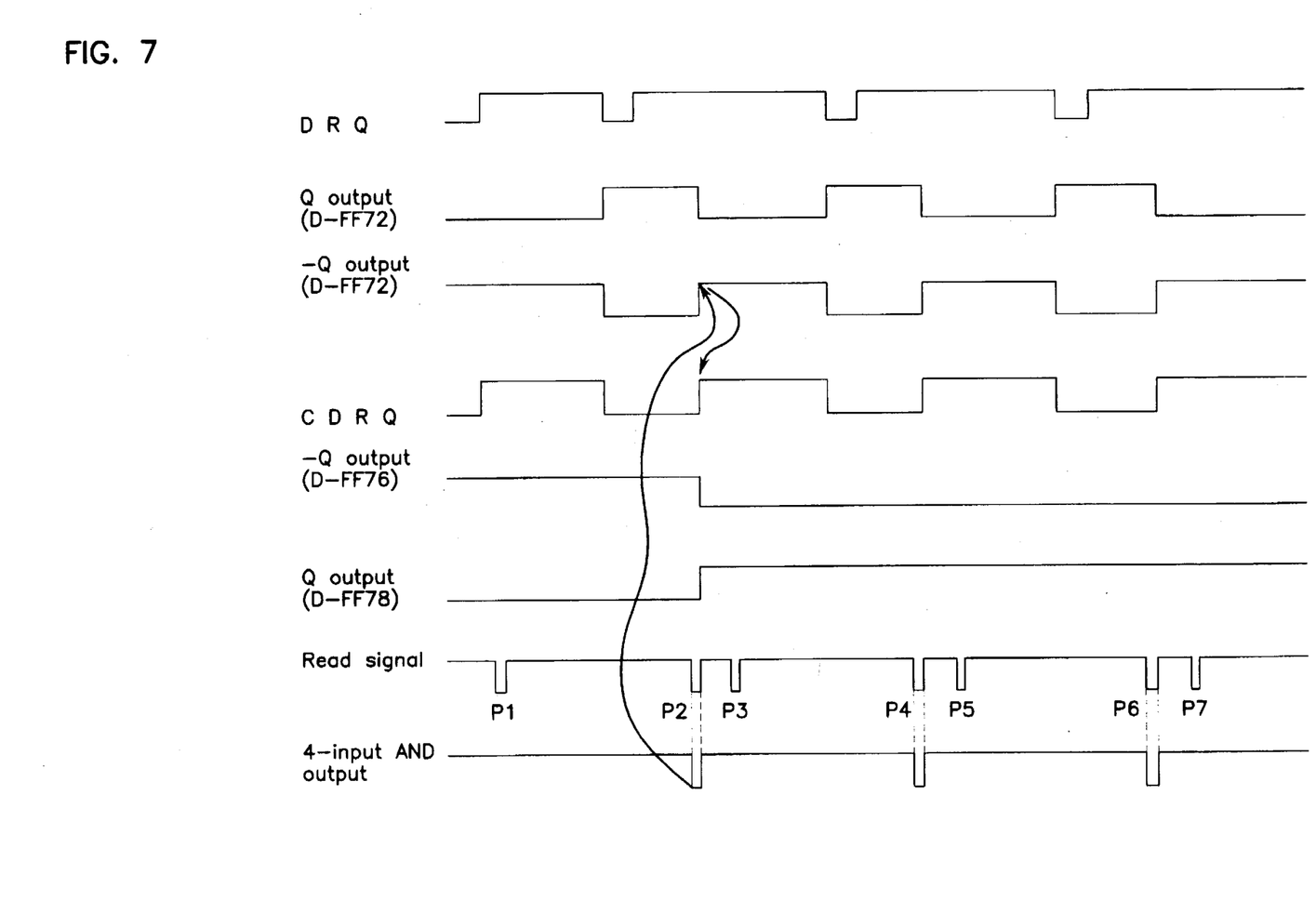
FIG. 7 is a timing diagram illustrating how the second embodiment is operated in the both-reading mode.

As shown in the timing diagram in FIG. 7, in the case of the both-reading mode, the host reads the status register 50 at P1 in order to transfer the first block of data, and the host reads the status register 50 again at P2 after the first block data transfer. Also, the host reads the status register 50 at P3 in order to transfer the next block data. The host reads the status register 50 again at P4 after that block data transfer. Thus, in the case of the both-reading mode, there exist read signals (P1, P3, P5, P7, . . . ) for reading the status register 50. Therefore, the timing diagram of the both-reading mode is shown in FIG. 7.

On the other hand, since, in the postreading mode, the read signals (i.e., P1, P3, P5, P7, . . . ) for reading the status register 50 do not exist, the timing diagram from which these signals were deleted becomes the timing diagram of the postreading mode.

In summary, a peripheral device may generates a data request when it is ready for block data transfer and then send an interrupt request to a host. In the first or prereading mode, the status of the peripheral device is read in response to the interrupt request. Then the host starts the block data transfer.

In the second or postreading mode, the host reads the status of the peripheral device after the block data transfer is completed. In the third or both-reading mode, the host reads the status of the peripheral device, starts the block data transfer and then reads the status of the peripheral device after the block data transfer is completed.

In the first or prereading mode, there is no possibility that the status of the peripheral device is read for a period between the time that the block data transfer is completed and the time that the peripheral device is ready for block data transfer, since the block data transfer is started after the status of the peripheral device has been read. However, in the second and third modes, the status of the peripheral device is read after the block data transfer is completed.

Then, the determination means of the present invention determines whether the status is read after the first block data transfer. The interrupt request output means then sends an interrupt request to the host by changing the timing according to the determination result of the determination means. Thus, it can be determined whether the host is in the first mode or not. Further, the interrupt request to be sent to the host can be controlled in all of the prereading mode, the postreading mode, and the both-reading mode.

The determination means in the invention determines whether the status is read within a predetermined period of time after the completion of the first block data transfer. Also, if it is determined that the status was not read by the determination means, the interrupt request output means sends the interrupt request to the host after the elapse of the predetermined period of time. When it is determined that the status was read by the determination means, the interrupt request output means sends the interrupt request to the host before the elapse of the predetermined period of time.

Thus, until it is determined that the status was read within a predetermined period of time after the completion of the first block data transfer, i.e., until it is determined that the host is the second mode or the third mode, the transmission of the interrupt request to the host is delayed. Therefore, the present invention can make it possible for the host to read the status of the peripheral device reliably after the completion of data transfer.

In addition, before the elapse of the predetermined period of time after the status was read, the interrupt request is sent to the host. Therefore, the host can start transferring data after the status was read, without waiting for an elapse of unnecessary time, so the overall processing speed of the computer system can be enhanced.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data transfer control interface circuit for controlling the transfer of data between a host and a peripheral device, comprising:

status reading means, coupled to a peripheral device, for ascertaining a status of a peripheral device;

data transfer means, coupled to the status reading means, for transferring data between the peripheral device and the host;

determination means, coupled to the status reading means, for determining whether the status is ascertained within a predetermined period of time after a first block data transfer; and interrupt request output means, coupled to the determination means, for controlling the timing for the issuance of an interrupt request based upon the determination of whether the status was ascertained with the predetermined period of time, the interrupt request triggering the transfer of data by the data transfer means, and wherein the interrupt request output means sends the interrupt request to the host after an elapse of the predetermined period of time in response to the status not being read by the determination means.

2. The interface circuit of claim 1, wherein the determination means includes a flip-flop, the flip-flop being set in response to a signal for initiating the reading of the status.

3. The interface circuit of claim 2 wherein the status reading signal is generated by the host.

4. The interface circuit as set forth in claim 1 wherein the determination means determines whether the status is read within a predetermined period of time after the completion of a first block data transfer.

5. The interface circuit as set forth in claim 1 wherein the interrupt request output means sends the interrupt request to the host after it is determined that the status was read and before the elapse of the predetermined period of time in response to the status being read by the determination means.

6. A data transfer control interface circuit for controlling the transfer of data between a host and a peripheral device, comprising:

a controller for administering control of a peripheral device;

a plurality of registers, coupled to the controller, the plurality of registers comprising a sector count register, an address register, a command register, a data register, and a status register;

register selector means, coupled to the registers, for selecting at least one of the registers;

status reading means, coupled to a peripheral device, for reading the status register;

data transfer means, coupled to the status reading means, for transferring the data between the peripheral device and the host;

determination means, coupled to the status reading means, for determining whether the status is ascertained within a predetermined period of time after a first block data transfer; and interrupt request output means, coupled to the determination means, for controlling the timing for the issuance of an interrupt request based upon the determination of whether the status was ascertained with the predetermined period of time, and wherein the interrupt request output means sends the interrupt request to the host after an elapse of the predetermined period of time in response to the status not being read by the determination means.

7. The interface circuit as set forth in claim 6 wherein the address register comprises two cylinder address registers, one sector address register, and one drive/head address register.

8. The interface circuit as set forth in claim 6 wherein the sector count register holds a number of sectors in which a read/write operation is performed, the address register holds a start address of the sector, the command register holds a command code, and the data register holds data.

9. The interface circuit as set forth in claim 6 wherein the status register comprises a plurality of bits representing the status of the peripheral device.

10. A disk drive system, comprising:

a device controller for administering control of a disk drive;

a sector buffer, coupled to the device controller, for storing data corresponding to a predetermined number of sectors;

spindle driver means, coupled to the device controller, for rotating at least one disk;

head means, coupled to the device controller, for moving the head relative to the surface of the disk, the head means further controlling read/write operations;

a data transfer control interface circuit, coupled to the device controller, for controlling the transfer of data to and from a host, the data transfer control interface further comprising:

status reading means for ascertaining the status of a peripheral device;

data transfer means, coupled to the status reading means, for transferring data between the disk drive and the host;

determination means, coupled to the status reading means, for determining whether the status is ascertained within a predetermined period of time after a first block data transfer; and interrupt request output means, coupled to the determination means, for controlling the timing for the issuance of an interrupt request based upon the determination of whether the status was ascertained with the predetermined period of time, and wherein the interrupt request output means sends the interrupt request to the host after an elapse of the predetermined period of time in response to the status not being read by the determination means.

11. The interface circuit of claim 10, wherein the determination means includes a flip-flop, the flip-flop being set in response to a signal for initiating the reading of the status.

12. the interface circuit of claim 11 wherein the status reading signal is generated by the host.

13. The interface circuit as set forth in claim 10 wherein the determination means determines whether the status is read within a predetermined period of time after the completion of a first block data transfer.

14. The interface circuit as set forth in claim 10 wherein the interrupt request output means sends the interrupt request to the host after it is determined that the status was read and before the elapse of the predetermined period of time in response to the status being read by the determination means.

15. A method of controlling data transfer between a host and a peripheral device, the method comprising the steps of:

reading the status of a peripheral device;

determining whether the status is read within a predetermined period of time after a first block data transfer;

controlling the timing for the issuance of an interrupt request based upon the determination of whether the status was ascertained with the predetermined period of time, the interrupt request being sent to the host after an elapse of the predetermined period of time in response to the status not being read; and transferring the data between the peripheral device and the host.

16. The interface circuit of claim 15, wherein the determination means includes a flip-flop, the flip-flop being set in response to a signal for reading the status.

17. the interface circuit of claim 16 wherein the status reading signal is generated by the host.

18. The interface circuit as set forth in claim 15 wherein the determination means determines whether the status is read within the predetermined period of time after the completion of a first block data transfer.

* * * * *

UNITED STATES PATENT AND TRADEMARK OFFICE
CERTIFICATE OF CORRECTION

PATENT NO.   : 5,896,540
DATED        : April 20, 1999
INVENTOR(S)  : Asano Hideo and Masayuki Murakaami It is certified that error appears in the above-identified patent and that said Letters Patent is hereby corrected as shown below:

Column 8,
Line 12, "Is" should be -- µs --.
Line 18, "bqth-reading" should be -- both-reading --.

Column 9,
Line 29, "gs" should be -- µs --.

Signed and Sealed this

Twenty-third Day of July, 2002

Attest:

Attesting Officer

JAMES E. ROGAN
Director of the United States Patent and Trademark Office